United States Patent [19]
Kraemer

[11] Patent Number: 5,478,175
[45] Date of Patent: Dec. 26, 1995

[54] CUTTING INSERT ASSEMBLY

[75] Inventor: Rolf H. Kraemer, Edinboro, Pa.

[73] Assignee: Greenleaf Corporation, Saegertown, Pa.

[21] Appl. No.: 111,163

[22] Filed: Aug. 24, 1993

[51] Int. Cl.$^6$ .................................................... B23B 27/14
[52] U.S. Cl. ................................................. 407/7; 407/64
[58] Field of Search .................................. 407/7, 64, 65, 407/100, 114, 115; 82/158

[56] References Cited

U.S. PATENT DOCUMENTS

| | | | |
|---|---|---|---|
| Re. 26,637 | 7/1969 | Vaughn . | |
| 1,838,520 | 12/1931 | Archer | 407/114 |
| 3,383,748 | 5/1968 | Galimberti et al. | 407/114 |
| 3,670,380 | 6/1972 | Moore et al. . | |
| 4,223,580 | 9/1980 | Sidorenko et al. . | |
| 4,378,184 | 3/1983 | Briese . | |
| 4,626,140 | 12/1986 | Zweekly et al. | 407/62 |
| 4,681,485 | 7/1987 | Koelewijn . | |
| 4,812,087 | 3/1989 | Stashko . | |
| 4,828,436 | 5/1989 | Briese | 407/76 |
| 4,893,967 | 6/1990 | Briese | 407/76 |
| 4,934,879 | 6/1990 | van Barneveld | 407/115 |
| 5,014,581 | 5/1991 | Komanduri et al. | 82/158 |
| 5,122,017 | 6/1992 | Niebauer | 407/115 |
| 5,141,367 | 8/1992 | Beeghly et al. | 407/76 |
| 5,249,894 | 10/1993 | Bernadic et al. | 407/114 |
| 5,324,144 | 6/1994 | Katbi et al. | 407/114 |

FOREIGN PATENT DOCUMENTS

| | | |
|---|---|---|
| 222120 | 7/1968 | U.S.S.R. . |
| 387794 | 6/1973 | U.S.S.R. . |
| 453244 | 12/1974 | U.S.S.R. . |
| 579105 | 11/1977 | U.S.S.R. . |
| 588067 | 2/1978 | U.S.S.R. . |
| 730482 | 4/1980 | U.S.S.R. . |
| 587854 | 5/1947 | United Kingdom . |

OTHER PUBLICATIONS

Jul. 1962 article by Staudinger entitled "Drehwerkzeug mit . . . Elektromashinenbau".
Mar. 1967 article by Amari entitled "Considerazioni . . . rotante".
Dec. 1972 article by Tollner entitled "Drehwerkzeug mit umlaufender Schneidscheibe".
Dec. 1972 article by Tollner entitled "Drehen mit . . . Schneidscheibe".
Article in Japanese on pp. 267–268.
1968 article by Zemlyanskii entitled "Kinematics and . . . Circular Tools".
Oct. 1969 article by Kasei, et al. entitled "Researches on . . . Cutting Tool".
May 1970 article by Narutaki, et al. entitled "Geometrical Analysis . . . Cutting Tools".
Apr. 1971 article by Kasei, et al. entitled "Research on . . . Cutting Tool".
Apr. 1971 article by Iwata, et al. entitled "Cutting Temperature . . . Cutting Tools".
Oct. 1971 article by Kasei, et al. entitled "Researches on . . . Cutting Tool (Part 3)".
Dec. 1971 article by Kasei, et al. entitled "Researches on . . . Cutting Tool (Part 4)".
1975 Article by Berkala, et al. entitled "A Study on The Self–Propelled Rotary Tool".
1977 article by Vorm entitled "Cutting With . . . Model Experiments".
1977 Article by Kasei, et al. entitled "researches on . . . Cutting Tool".

(List continued on next page.)

*Primary Examiner*—Maurina T. Rachuba
*Attorney, Agent, or Firm*—Kirkpatrick & Lockhart

[57] ABSTRACT

A cutting insert assembly is disclosed which includes a rotatable cutting insert for cutting a material, and a rotational support for rotatably supporting the cutting insert. Structure for retaining the cutting insert to the support and for inducing rotation of the cutting insert as the cutting insert cuts the material are also provided.

37 Claims, 4 Drawing Sheets

OTHER PUBLICATIONS

Article in Machines and Tooling, vol. XLIII No. 4 by Esterzon, et al. entitled "Metal Peeling".

ASME publication by Friedman entitled "A General Approach . . . Curved Surfaces".

Article by Dyer, et al. entitled "Experiments With Self–Propelled Rotary Cutting Tools".

Article in Russian Engineering Journal, vol. XLIX No. 8 by Konovalov entitled "Applications of rotating lathe–tools".

Article in Machines and Tools, vol. XLIII No. 8 by Konovalov entitled "Finish–Milling Plane Surface With A Rotational Tool".

Greenleaf Corp. brochure entitled "Greenleaf WG–300 Whisker Reinforced Ceramic Grooving System".

Greenleaf Corp. brochure entitled "Toolholding Systems for Greenleaf WG–300 Whisker Reinforced Ceramic".

Greenleaf Corp. catalog entitled "Industry–Standard Toolholders".

Greenleaf Corp. catalog entitled "Index–o–Cut Milling Cutters".

Rotary Technologies Corp. brochure entitled "RTC Milling & Turning Tools".

S.M.E. technical paper by Pauls entitled "Introduction to the Rotary Cutter".

CUTTING INSERT ASSEMBLY

BACKGROUND OF THE INVENTION

1. Field of the Invention

The present invention relates to devices useful for cutting a material. More particularly, the present invention relates to devices such as cutting insert assemblies useful for cutting a material such as metal.

2. Description of the Invention's Background

Cutting inserts are useful for cutting materials such as metals. For such a purpose, a cutting insert is commonly mounted to a cutting tool, and the cutting tool is rotated while the material is fed toward the cutting tool or the cutting tool is fed toward the material. A cutting edge of the cutting insert cuts off a small piece of the material, i.e., a chip, each time it passes across the material with rotation of the cutting tool. The problem with such an arrangement, however, is that the area of the cutting edge in contact with the work quickly becomes very hot due to the friction generated by cutting, which causes relatively rapid degeneration of the cutting edge and thus causes the cutting insert to have a relatively short useful life. Shorter useful lives in cutting tools requires the cutting process to be interrupted, the machine stopped and the cutting tool removed and replaced prior to resuming cutting.

To lengthen the useful life of a cutting insert, cutting inserts have been designed with multiple or continuous edges, such that the cutting insert may be indexed to present a new edge or a new portion of an edge once one edge or portion thereof has worn out. For example, U.S. Pat. No. 4,812,087 to Stashko discloses a circular cutting insert 34 for an end mill cutting tool which is held to the tool by a screw 36. When one portion of a cutting edge of the cutting insert 34 becomes worn, the screw 36 can be loosened and the cutting insert 34 can be indexed and retightened to present another portion of the cutting edge. Such an arrangement has the disadvantage, however, that it requires the tool movement to be stopped and the cutting insert to be physically unfastened, turned, and refastened each time an edge portion becomes worn. Such a procedure is very time consuming and thus decreases the cost effectiveness of the cutting insert.

Other cutting inserts have been designed which are freely rotatable relative to the cutting tool to which they are mounted. For example, U.S. Pat. No. Re. 26,637 discloses in FIG. 5 a cutter 7 which is mounted on a shaft 8 by a nut and bolt, which shaft 8 is held rotatably by a bushing 9 attached to a rotary cutting tool 1. U.S. Pat. No. 4,893,967 to Briese discloses in FIG. 11 a cutting insert 26 which has upper and lower concave surfaces and which is mounted on a spindle 168, and a split bushing 22 in which the spindle 168 is rotatably held by a thrust retainer 192, such as a nut. The split bushing 22 is held in a cutting tool 12 by a snap ring 82. As the cutting tool 12 rotates, the cutting insert 26 may rotate about its own axis.

The article entitled "Finish-Milling Plane Surface with a Rotational Tool" by E. G. Konovalov, et al. discloses in FIG. 1(b) a cutting tip 1 which rotates about its own axis as a result of interaction with a workpiece surface, and which is held on a shaft 3 by a nut. The shaft 3 rotates within an insert 4 which is pressed into a casing 8. Soviet Patent No. 387,794 to E. G. Kuzovenko, et al. discloses an independently rotating cutting tool 2 which is fixed on a support 3 and which has a flywheel 5 fastened on an end 4 of a cutting tool shaft. Although the above-noted devices allow rotation of a cutting insert, they have the disadvantage of failing to provide a means for inducing the cutting insert to rotate about its own axis as it cuts a material. Cutting inserts of the above type are thus more likely to jam or stick, or simply fail to rotate, such that the expected benefits of a rotatable insert are not achieved. Specifically, if the insert does not rotate, heat builds up in one portion of the cutting edge and that portion of the cutting edge fails relatively rapidly. Also, the cutting inserts fail to suggest the structural benefits of a rotatable cutting insert having a head and shaft which are one piece.

OBJECTION AND SUMMARY OF THE INVENTION

In view of the above, it is an object of the present invention to provide an improved cutting insert assembly.

It is another object of the present invention to provide a cutting insert having a head and shaft which are one piece.

It is another object of the present invention to provide a cutting insert assembly which includes a cutting insert which is readily rotatable.

It is a further object of the present invention to provide a cutting insert assembly which includes means to induce rotation of a cutting insert thereof.

A further object of the present invention is to provide a cutting insert assembly which has a relatively long life and which requires relatively little maintenance.

Another object, of the present invention is to provide a cutting insert assembly which includes a cutting insert which is relatively easy to change once it has become worn.

The above objects as well as other objects not specifically enumerated are accomplished by a cutting insert assembly in accordance with the present invention. The cutting insert assembly of the present invention includes rotatable cutting insert means for cutting a material, which cutting insert means includes head means and shaft means which are of one piece, rotational support means for rotatably supporting the cutting insert means, which rotational support means includes bushing means for surrounding the shaft means, and retaining means for retaining the cutting insert means to the support means.

The objects of the present invention are also accomplished by a cutting insert assembly which includes rotatable cutting insert means for cutting a material, rotational support means for rotatably supporting the cutting insert means, retaining means for retaining the cutting insert means to the support means, and means for inducing rotation of the cutting insert means as the cutting insert means cuts the material.

The objects of the invention are also accomplished by a cutting insert assembly for mounting on a rotatable cutting tool and for cutting a material, which includes rotatable cutting insert means for cutting the material, and rotational support means for supporting the cutting insert means on the rotatable cutting tool such that the cutting insert means is rotatable relative to the rotatable cutting tool. The assembly further includes retaining means for retaining the cutting insert means to the support means, and means for inducing rotation of the cutting insert means relative to the rotatable cutting tool as the cutting insert means cuts the material.

The objects of the invention are further accomplished by a cutting insert assembly which includes a rotatable cutting insert for cutting a material, which cutting insert has a top surface, and a support, wherein the cutting insert is rotatably supported by the support. The assembly further includes a retainer which is attached to one of the cutting insert and the support to retain the cutting insert to the support, and a plurality of surface irregularities on the top surface of the cutting insert to induce rotation of the cutting insert as the cutting insert cuts the material.

The objects of the present invention are further accomplished by a cutting assembly for cutting a material, which includes a rotatable cutting tool which has an insert cavity therein, a rotatable cutting insert for cutting the material, which cutting insert has a top surface, and a support fixed in the insert cavity, wherein the cutting insert is rotatably supported by the support such that the cutting insert is rotatable relative to the cutting tool. The cutting tool assembly further includes a plurality of surface irregularities on the top surface of the cutting insert to induce rotation of the cutting insert relative to the cutting tool as the cutting insert cuts the material.

BRIEF DESCRIPTION OF THE DRAWINGS

The preferred embodiment of the present invention will be described in greater detail with reference to the accompanying drawings, wherein like members bear like reference numerals and wherein.

DETAILED DESCRIPTION OF THE PREFERRED EMBODIMENT

Figure 1:
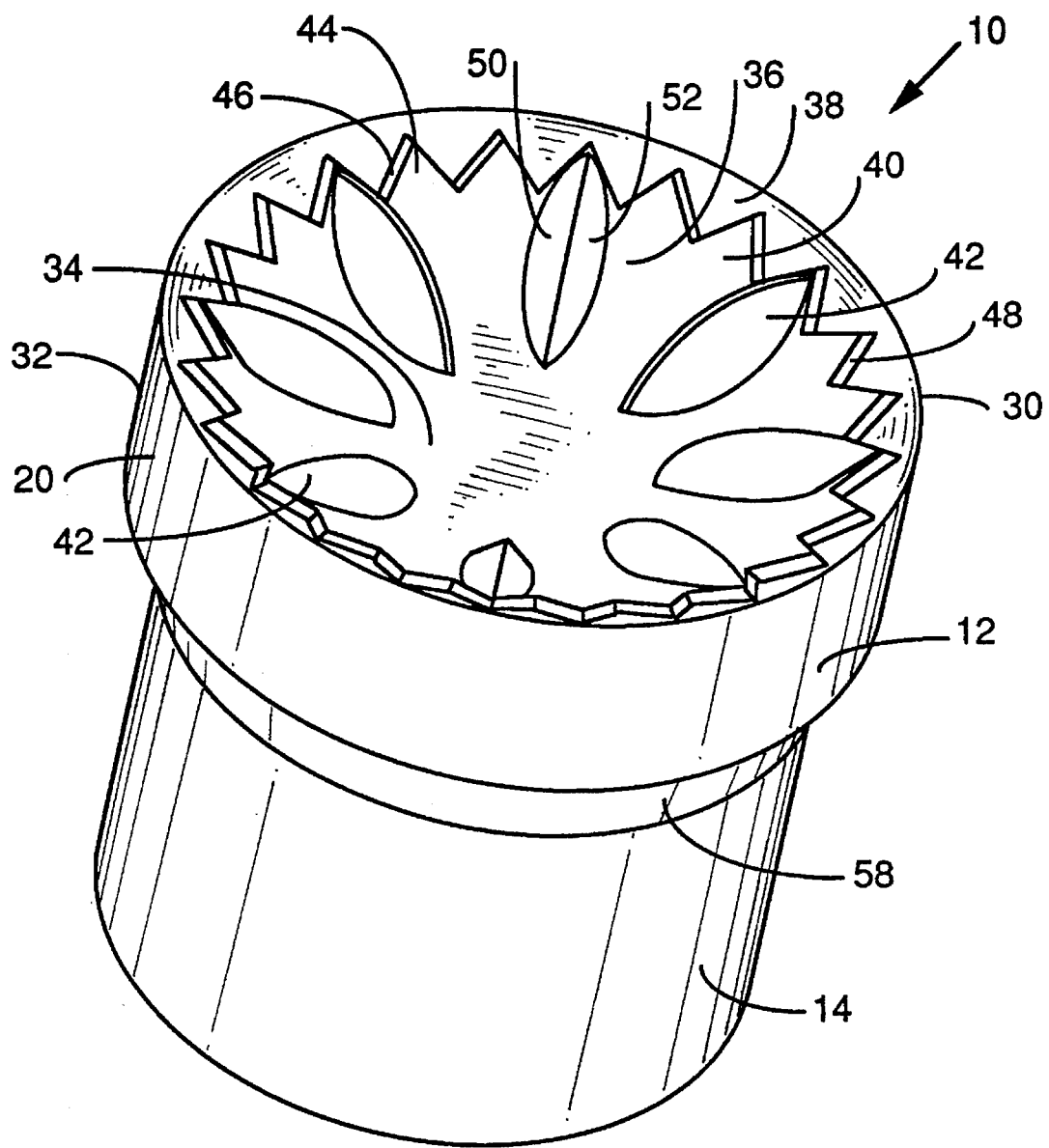
FIG. 1 is a perspective view of a cutting insert assembly according to the present invention.
Figure 2:
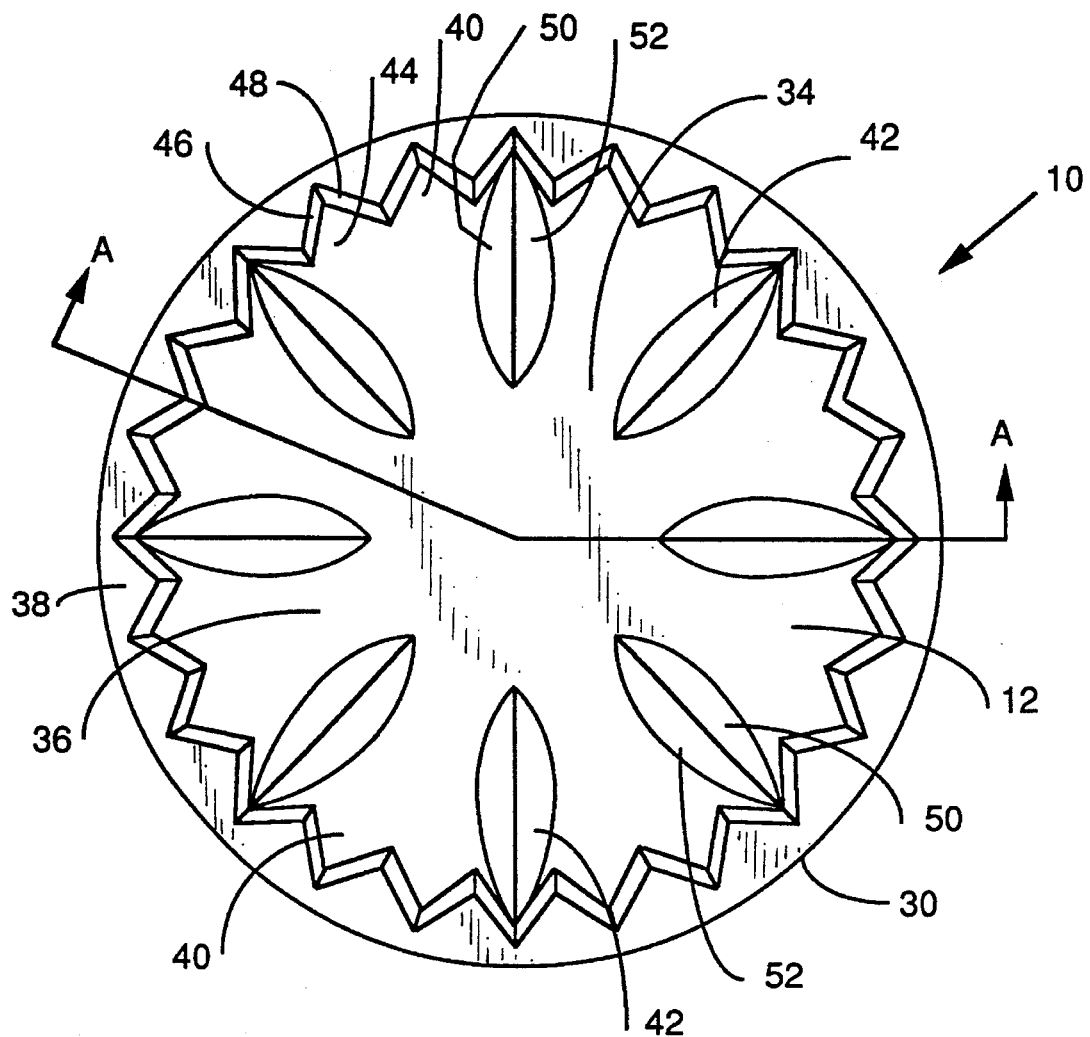
FIG. 2 is a top view of the cutting insert assembly of FIG. 1.
Figure 3:
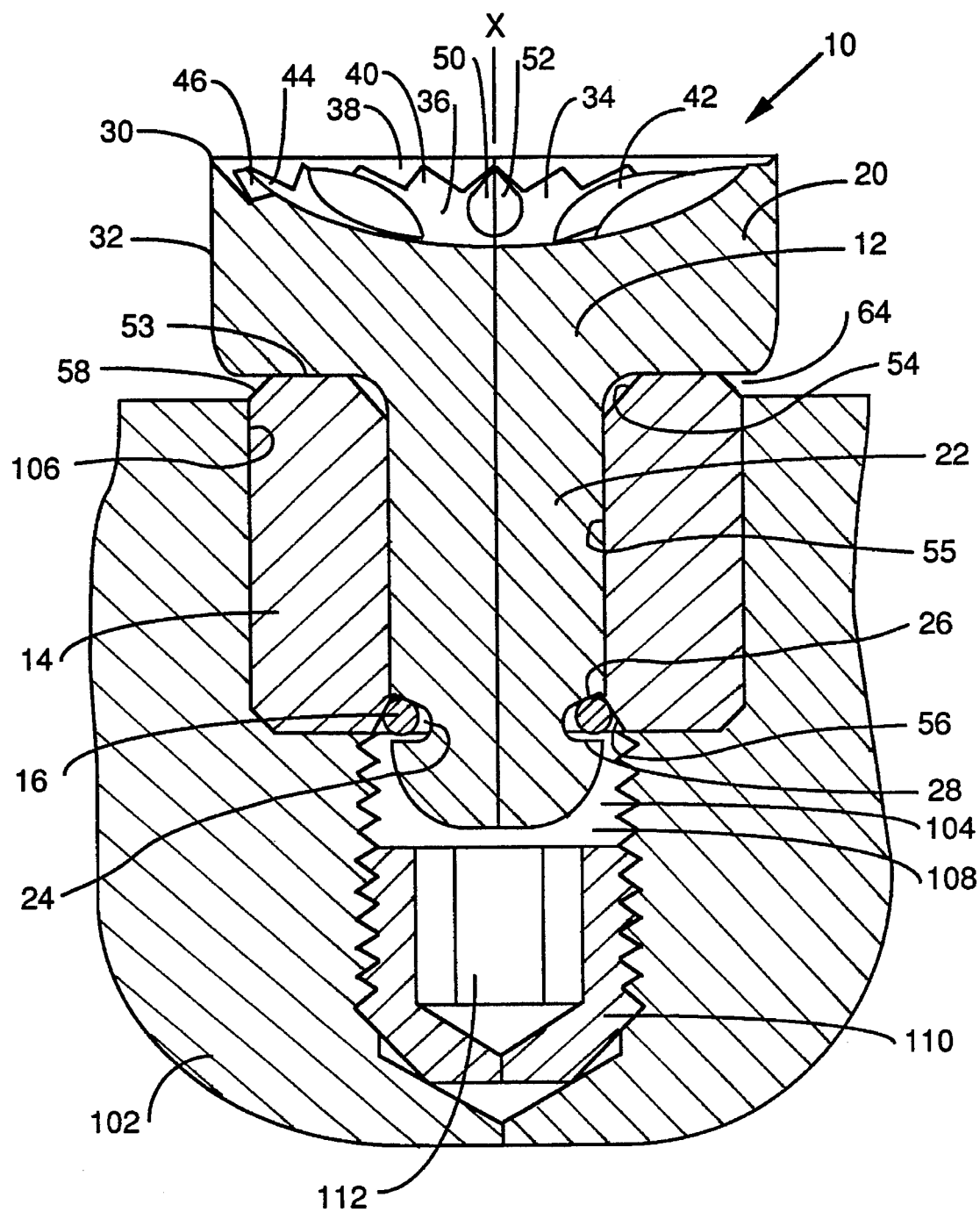
FIG. 3 is a cross-sectional view along line A—A of FIG. 2.

With reference to FIGS. 1–5, a cutting insert assembly 10 in accordance with an embodiment of the present invention includes a rotatable cutting insert 12, a bushing 14, and a spring clip 16. The cutting insert 12 includes a head 20 and a shaft 22, which are formed as one piece. The shaft 22 has a circumferential groove 24 therein which is spaced from the head 20. As can be seen in FIG. 3, the groove 24 includes an upper surface 26 which is angled acutely relative to an axis X of the cutting insect 12, and a bottom surface 28 which is generally perpendicular to the axis X. The head 20 of the cutting insert 12 includes a cutting edge 30 formed by the meeting of a circumferential side surface 32 and a top surface 34.

The top surface 34 includes an inner portion 36 which is concave, and an outer portion 38 which is also concave. A plurality of surface irregularities, in the form of a plurality of serrations, or toothed projections, 40 and a plurality of raised obstructions 42, are formed on and project from the top surface 34. The serrations 40 are placed such that they form a continuous serration on the top surface 34 adjacent the cutting edge 30. As shown in FIGS. 1 and 2, each serration 40 is pointed outwardly along the top surface 34 toward the cutting edge 30, and is formed by a toothlike extension 44 of the inner portion 36 of the top surface 34, and a pair of side walls 46, 48. Each serration 40 thus projects upwardly from the outer portion 38 of the top surface 34, in a direction normal to the outer portion 38. The raised obstructions 42 are spaced circumferentially around and project upwardly from the inner portion 36 of the top surface 34, in a direction normal to the inner portion 36. Each of the raised obstructions 42 is shown as an elongated arcuate projection which has a first arcuate side 50 and a second arcuate side 52.

Figure 4:
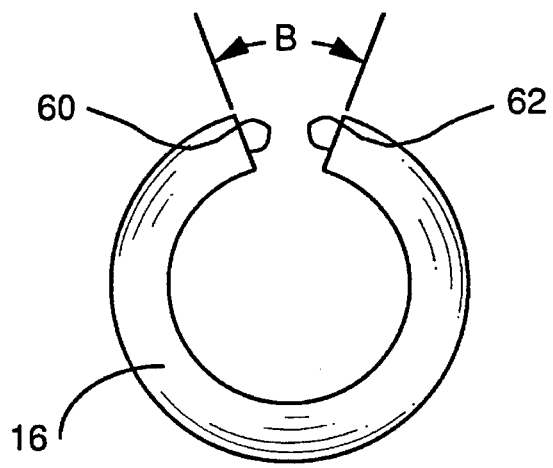
FIG. 4 is a top view of a spring clip of the cutting insert assembly of FIG. 1.

The bushing 14 is a toroid, and includes a bearing surface 53 and a central passage 55 therethrough. The bushing 14 further includes a conical surface 54 at an outer end of the central passage 55, a conical surface 56 at an inner end of the central passage 55, and a conical surface 58 adjacent an outside circumference of the bearing surface 53. As is shown in FIG. 3, the spring clip 16 has a circular cross section, and, as shown in FIG. 4, is generally C-shaped. When the spring clip 16 is in an uncompressed state, ends 60, 62 of the spring clip 16 are angled relative to each other at an angle B of about 30 degrees.

A variety of materials may be used in the cutting insert 12, the bushing 14, and the spring clip 16. For example, the cutting insert 12 is preferably made of a tungsten carbide cutting tool material and, more preferably of a coated carbide. Examples of appropriate materials for cutting insert 12 include tungsten carbide coated with titanium nitride, titanium carbide, aluminum oxide or combinations thereof. The cutting insert 12 can also be made of high speed steel. The bushing 14 is preferably made of a heat resistant, high strength, high wear resistant, low friction material that is strong enough to withstand cutting forces, such as silicon nitride ceramic or a toughened ceramic composite such as silicon carbide whisker reinforced alumina, but can also be made of carbide steel such as tungsten carbide. The spring clip is preferably made of spring steel, but can also be made of copper. The use of a carbide insert and a silicon nitride bushing allows the cutting insert assembly 10 to be designed without bearings, since the insert has a low thermal expansion coefficient and the bushing an even lower thermal expansion coefficient. Free rotation of the insert is thus ensured even when the insert or the bushing is heated.

Figure 5:
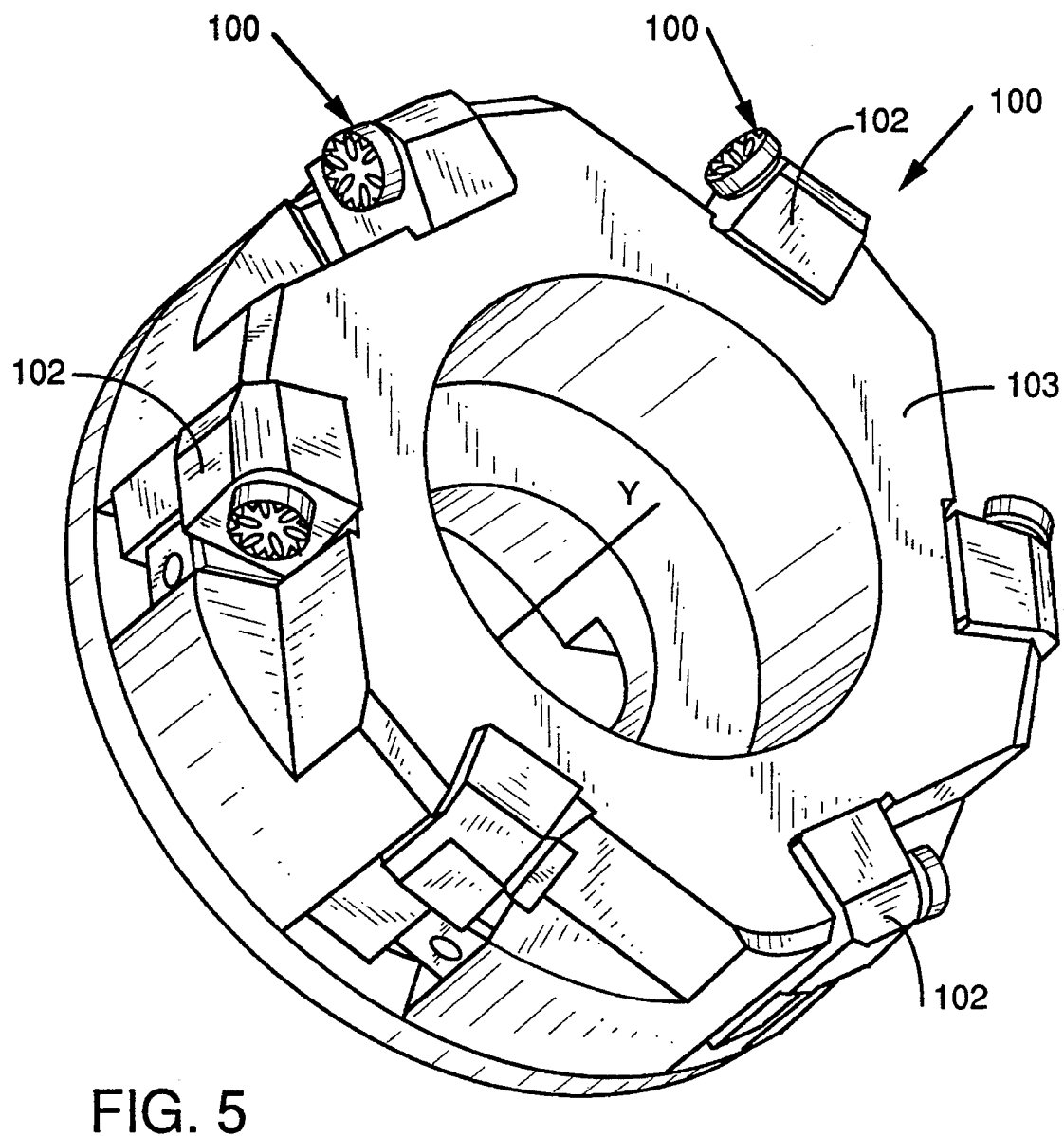
FIG. 5 is a perspective view of a cutting tool assembly including a plurality of the cutting insert assemblies of FIG. 1.

The cutting insert assembly 10 is normally used in a cutting tool assembly 100, such as shown in FIG. 5, which may be a milling cutter, a drill, a turning toolholder, a boring bar, or another type of tool assembly (not shown). The cutting tool assembly 100 includes a plurality of cutting insert assemblies 10 mounted on a plurality of cutting tools 102, which in turn are mounted on a tool holder 103. The cutting tool assembly 100 is rotatable by a rotating means (not shown) about an axis Y, and is connected through the rotating means to a base (not shown). As shown in FIG. 3, each cutting tool 102 includes a cavity 104 therein. The cavity 104 includes an upper part 106 which is of a wider diameter and is generally cylindrical, and a lower part 108 which is of a smaller diameter and is internally threaded. A removal plug 110 which is externally threaded and which has a tool socket 112 therein is also provided.

With reference to FIGS. 1–5, the structure and operation of the cutting insert assembly 10, the cutting tool assembly 100, and the removal plug 110 will now be explained. With a cutting tool 102 in a stationary position and with the cavity 104 thereof empty, a removal plug 110 is first threaded into the lower part 108 of the cavity 104 by a tool (not shown) which mates with the tool socket 112. The bushing 14 is then press fit into the upper part 106 of the cavity 104. The cutting insert 12 and the spring clip 16 are assembled such that the spring clip 16 extends around the shaft 22 of the cutting insert 12 in the groove 24. It should be understood that at this point the spring clip 16 is in an uncompressed state and thus is only partly within the groove 24 and extends partly out of the groove 24. The shaft 22 of the cutting insert 12 is then inserted into the central passage 55 in the bushing 14. As the shaft 22 is inserted, the spring clip 16 contacts the conical surface 54 and is compressed as the spring clip 16 is forced downwardly along the conical surface 54, until the spring clip 16 is compressed to a point where it rests entirely within the groove 24 and the shaft 22 is thus free to slide into the central passage 55. The spring clip 16 is relatively easily compressed into the groove 24 because the conical section 54 is angled more acutely relative to the axis X than the upper surface 26 of the groove 24. The conical section 54 and the upper surface 26 thus cooperate to wedge the spring clip 16 into the groove 24 as the shaft 22 is pushed downwardly into the central passage 55.

At this point, the spring clip 16 is in a highly compressed state, and the ends 60, 62 of the spring clip 16 are generally adjacent to each other in the groove 24. The cutting insert 12 is pushed downwardly until the head 20 rests on the bearing surface 53, the bushing 14 surrounds a large portion of the shaft 22, and the groove 24 in the shaft 22 is adjacent the conical surface 56. The spring clip 16 is thus able to expand and extend out of the groove 24 somewhat, such that a portion of the bushing 14 extends between the head 20 and the spring clip 16. The spring clip 16, therefore, resists upward movement of the cutting insert 12 and retains the cutting insert to the bushing 14 by retaining the shaft 22 within the bushing 14. The shaft 22 is free to rotate within the central passage 55, and the head 20 is free to rotate above the bearing surface 53. The cutting insert 12 is thus rotatably supported by the bushing 14 such that it is free to rotate about its axis X relative to the bushing 14 and the cutting tool assembly 100. As stated above, the cutting tool assembly 100 is rotatable about the axis Y, which is normally a different axis than the axis X.

In use, the cutting tool assembly 100 is rotated by the rotating means relative to the base, and a material to be cut is moved linearly toward the base or the base is moved linearly toward the material, such that the material is fed to the rotating cutting tool assembly 100. It is to be understood that any reference hereinbelow to the material being fed to the cutting tool assembly 100 refers both to situations where the material is moved toward the base and situations where the base is moved toward the material. The feed rate at which the material is fed to the cutting tool assembly 100 can be defined as the linear velocity of the material relative to the base, whereas the cutting speed at which material is cut can be defined as the addition of the linear velocity of the material relative to the base and the angular velocity of the cutting tool assembly 100 relative to the base. Thus, either an increase in the feed rate or an increase in the rotating speed of the cutting tool assembly 100 will produce an increase in the cutting speed, as defined.

As the material is fed to the cutting tool assembly 100, the respective cutting edges 30 of each of the cutting inserts 12 are brought into contact with the material with the rotation of the cutting tool assembly 100. As a portion of a cutting edge 30 makes contact with the material, it cuts or shears off a small portion, or chip, of the material from the material. This cutting or shearing action generates a relatively large amount of heat, which heat is transferred both to the portion of the cutting edge 30 and the chip. As the chip is separated from the material, it curves away from the material and runs across the top surface 34 of the cutting insert 12. Depending on the relative cutting speed and the relative depth of the cut, as detailed below, the chip will contact the serrations 40 and/or one or more of the raised obstructions 42, which will force the cutting insert 12 to rotate relative to the cutting tool assembly 100. Since the cutting insert 12 is constrained such that it can only move in a rotational direction, it will rotate in response to the contact between the chip and the serrations 40 or one or more of the raised obstructions 42. Both the serrations 40 and the raised obstructions 42 thus act to induce rotation of the cutting insert 12 relative to the bushing 14, and thus the cutting tool assembly 100, during cutting of the material. Since the cutting insert 12 rotates about its own axis X during cutting, the portion of the cutting edge 30 which cuts the material is constantly varied during cutting, such that a relatively large amount of the heat which is transferred to a portion of the cutting edge 30 during cutting can be dissipated before that same portion is used to cut the material again.

At relatively low cutting speeds and relatively small depths of cut, it is more likely for smaller chips to be formed during cutting and for those chips to move across the top surface 34 more slowly before they are broken off from the material, and it is thus more likely for those smaller chips to contact the serrations 40 than the raised obstructions 42. The serrations 40 thus tend to act as a means for inducing rotation of the cutting insert 12 at low cutting speeds and small cutting depths. At relatively high cutting speeds and relatively large cutting depths, it is more likely for larger chips to be formed and for those chips to move more quickly across the top surface 34, and thus for those larger chips to contact the raised obstructions 42 than the serrations 40. The raised obstructions 42 thus tend to act as a means for inducing rotation of the cutting insert 12 at high cutting speeds and large cutting depths. In addition, the raised obstructions 42 also help to raise chips off of the top surface 34, especially during relatively high speed and large depth cutting, and thus help to restrict the amount of heat that is conducted to the cutting insert 12 from the chips.

After the cutting insert 12 has been used for a period of time, the cutting edge 30 will eventually dull to the point where the cutting insert 12 will need to be replaced. Feeding of material to the cutting tool assembly 100 is therefore terminated, and rotation of the cutting tool assembly 100 is stopped. Because a conical section 58 is provided on each bushing 14, there is a space 64 underneath the head 20 of each cutting insert 12 into which a tool (not shown) is inserted to pull or pry the cutting insert 12 away from the bushing 14. As the shaft 22 is pulled upwardly, the bottom surface 28 of the groove 24 and the conical surface 56 of the bushing 14 cooperate to wedge the spring clip 16 back into a highly compressed state such that the spring clip 16 is contained within the groove 24 and the shaft 22 is free to slide out of the central passage 55 of the bushing 14. A new cutting insert 12 may then be installed and used as detailed above.

Periodically, a bushing 14 will wear down or become damaged due to prolonged use and numerous changings of cutting inserts. When that occurs, the respective cutting insert 12 is removed, and a tool (not shown) is inserted through the central passage 55 in the bushing 14 into the tool socket 112 in the removal plug 110. The removal plug 110 is then threaded back out of the lower part 108 of the cavity 104 such that it contacts the bushing 14 and forces it out of the cavity 104. A new removal plug 110 can then be threaded into the lower part 108 of the cavity 104, and a new bushing 14 can be press fit into the upper part 106 of the cavity 104.

The advantages of the cutting insert assembly 10 of the present invention are readily apparent. Since the cutting insert 12 includes a head 20 and a shaft 22 which are one piece, rotation of the head 20 is accomplished with minimal eccentricity and thus minimal abnormal wear. Also, since means are provided to induce rotation of the cutting insert 12 during cutting at low cutting speeds, high cutting speeds, small cutting depths, and large cutting depths, the heat transferred to any one portion of the cutting edge 30 over time is minimized, which greatly reduces the overall heating of any one portion of the cutting edge 30 and the cyclical thermal stress experienced by stationary cutting insert cutting edges. The present invention thus provides a cutting insert which, although it will eventually wear out, lasts much longer because it avoids much of the degradation which can be caused by the heat generated during cutting. In addition, the provision of raised obstructions 42 on the top surface 34 of the cutting insert 12 helps to raise chips off of the top surface 34 and thus to reduce secondary heating of the cutting insert 12 by the chips. It should further be recognized that by providing a rotatable cutting insert 12 which is supported without bearings and which is retained by a snap-on spring clip 16, the cutting insert assembly 10 provides an arrangement that is relatively easy to use and replace when worn, and which requires relatively little maintenance.

It is to be understood that, while not shown in the drawings, it is within the scope of the invention to fix the bushings 14 to the cutting tools 102 by means other than press fit, such as by screw, threaded attachment, cementing, etc. Retainers other than the spring clip 16, such as a nut fastened to the shaft 22, are also within the scope of the invention. It should also be apparent that different surface irregularities may be used to induce rotation of the cutting insert 12, and such surface irregularities are within the scope of the invention. The top surface 34 of the cutting insert 12 may advantageously be shaped other than concavely, i.e, it may be made flat or convex, and the resultant assembly would be within the scope of the invention.

The principles, a preferred embodiment and the mode of operation of the present invention have been described in the foregoing specification. However, the invention which is intended to be protected is not to be construed as limited to the particular embodiment disclosed. The embodiment is therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

What is claimed is:

1. A cutting insert assembly, comprising:
   rotatable cutting insert means for cutting a material, said cutting insert means including a head and a shaft which are of one piece, said head including a cutting edge;
   rotational support means for rotatably supporting said cutting insert means, said rotational support means including a bushing for surrounding said shaft; and
   retaining means for retaining said shaft to said bushing.

2. A cutting insert assembly as claimed in claim 1, further including means located on said head spaced from said cutting edge, for inducing rotation of said cutting insert means as said cutting insert means cuts the material.

3. A cutting insert assembly as claimed in claim 2, wherein said rotation inducing means includes first rotation inducing means for inducing rotation of said cutting insert means at low cutting speeds and small cutting depths, and second rotation inducing means for inducing rotation of said cutting insert means at high cutting speeds and large cutting depths.

4. A cutting insert assembly as claimed in claim 3, wherein said first rotation inducing means comprises a serration adjacent but spaced from said cutting edge.

5. A cutting insert assembly as claimed in claim 3, wherein said second rotation inducing means comprises a raised obstruction of said head.

6. A cutting insert assembly as claimed in claim 1, wherein said retaining means includes a groove on said shaft, and a spring clip resting in and extending out of said groove for retaining said shaft within said bushing.

7. A cutting insert assembly as claimed in claim 1, wherein said bushing is made of a low friction material.

8. A cutting insert assembly, comprising:
   rotatable cutting insert means for cutting a material, said cutting insert means including a head having a cutting edge;
   rotational support means for rotatably supporting said cutting insert means;
   retaining means for retaining said cutting insert means to said support means; and
   means, located on said head spaced from said cutting edge, for inducing rotation of said cutting insert means as said cutting insert means cuts the material.

9. A cutting insert assembly as claimed in claim 8, wherein said rotation inducing means includes first rotation inducing means for inducing rotation of said cutting insert means at low cutting speeds and small cutting depths, and second rotation inducing means for inducing rotation of said cutting insert means at high cutting speeds and large cutting depths.

10. A cutting insert assembly as claimed in claim 9, wherein said first rotation inducing means comprises a serration adjacent but spaced from said cutting edge.

11. A cutting insert assembly as claimed in claim 9, wherein said second rotation inducing means comprises a raised obstruction of said head.

12. A cutting insert assembly as claimed in claim 8, wherein said cutting insert means includes a shaft which is of one piece with said head, and said rotational support means includes a bushing for surrounding said shaft.

13. A cutting insert assembly as claimed in claim 12, wherein said retaining means includes a groove of said shaft, and a spring clip resting in and extending out of said groove for retaining said shaft within said bushing.

14. A cutting insert assembly for mounting on a rotatable cutting tool and for cutting a material, comprising:
   rotatable cutting insert means for cutting the material, said cutting insert means including a head having a cutting edge;
   rotational support means for supporting said cutting insert means on the rotatable cutting tool such that said cutting insert means is rotatable relative to the rotatable cutting tool;
   retaining means for retaining said cutting insert means to said support means; and
   means, located on said head spaced from said cutting edge, for inducing rotation of said cutting insert means relative to the rotatable cutting tool as said cutting insert means cuts the material.

15. A cutting insert assembly as claimed in claim 14, wherein said rotation inducing means includes first rotation inducing means for inducing rotation of said cutting insert means at low cutting speeds and small cutting depths, and second rotation inducing means for inducing rotation of said cutting insert means at high cutting speeds and large cutting depths.

16. A cutting insert assembly as claimed in claim 15, wherein said first rotation inducing means comprises a serration adjacent but spaced from said cutting edge.

17. A cutting insert assembly as claimed in claim 15, wherein said second rotation inducing means comprises a raised obstruction of said head.

18. A cutting insert assembly as claimed in claim 14, wherein said cutting insert means includes a shaft which is one piece with said head, and said rotational support means includes a bushing for surrounding said shaft.

19. A cutting insert assembly as claimed in claim 18, wherein said retaining means includes a groove of said shaft, and a spring clip resting in and extending out of said groove for retaining said shaft within said bushing.

20. A cutting insert assembly as claimed in claim 18, wherein said bushing is made of a low friction material.

21. A cutting insert assembly, comprising:
 a rotatable cutting insert for cutting a material, said cutting insert having a top surface and a cutting edge;
 a support, said cutting insert being rotatably supported by said support;
 a retainer, said retainer being attached to one of said cutting insert and said support to retain said cutting insert to said support; and
 a plurality of surface irregularities on said top surface of said cutting insert spaced from said cutting edge to induce rotation of said cutting insert as said cutting insert cuts the material.

22. A cutting insert assembly as claimed in claim 21, wherein said plurality of surface irregularities includes a plurality of serrations adjacent but spaced from said cutting edge, to induce rotation of said cutting insert at low cutting speeds and small cutting depths.

23. A cutting insert assembly as claimed in claim 22, wherein said plurality of serrations form a continuous serration around said top surface adjacent said edge.

24. A cutting insert assembly as claimed in claim 21, wherein said plurality of surface irregularities includes a plurality of raised obstructions on said top surface, to induce rotation of said cutting insert at high cutting speeds and large cutting depths.

25. A cutting insert assembly as claimed in claim 24, wherein each of said plurality of raised obstructions is an arcuate elongated projection extending upwardly from said top surface in a direction normal to said top surface.

26. A cutting insert assembly as claimed in claim 21, wherein said cutting insert is one piece and includes a head and a shaft, and wherein said support is a bushing having a central passage therethrough, said shaft resting rotatably within said passage.

27. A cutting insert assembly as claimed in claim 26, wherein said shaft has a groove therein spaced from said head, and wherein said retainer includes a spring clip lodged in and extending out of said groove, a portion of said bushing extending between said head and said spring clip such that said cutting insert is retained to said bushing.

28. A cutting insert assembly as claimed in claim 21, wherein said top surface is concave.

29. A cutting tool assembly for cutting a material, comprising:
 a rotatable cutting tool, said cutting tool having a cavity therein;
 a rotatable cutting insert for cutting the material, said cutting insert having a top surface and a cutting edge;
 a support fixed in said cavity, said cutting insert being rotatably supported by said support such that said cutting insert is rotatable relative to said cutting tool; and
 a plurality of surface irregularities on said top surface said cutting insert spaced from said cutting edge to induce rotation of said cutting insert relative to said cutting tool as said cutting insert cuts the material.

30. A cutting tool assembly as claimed in claim 29, wherein said plurality of surface irregularities includes a plurality of serrations adjacent but spaced from said cutting edge, to induce rotation of said cutting insert at low cutting speeds and small cutting depths.

31. A cutting tool assembly as claimed in claim 30, wherein said plurality of serrations form a continuous serration around said top surface adjacent said edge.

32. A cutting tool assembly as claimed in claim 29, wherein said plurality of surface irregularities includes a plurality of raised obstructions on said top surface, to induce rotation of said cutting insert at high cutting speeds and large cutting depths.

33. A cutting tool assembly as claimed in claim 32, wherein each of said plurality of raised obstructions is an arcuate elongated projection extending upwardly from said top surface in a direction normal to said top surface.

34. A cutting tool assembly as claimed in claim 29, wherein said cutting insert is one piece and includes a head and a shaft, and wherein said support is a bushing which is press fit in said cavity and which has a central passage therethrough, said shaft resting rotatably within said passage.

35. A cutting tool assembly as claimed in claim 34, wherein said shaft has a groove therein spaced from said head, and wherein said assembly further includes a spring clip lodged in and extending out of said groove, a portion of said bushing extending between said head and said spring clip such that said cutting insert is retained to said bushing.

36. A cutting tool assembly as claimed in claim 34, wherein said bushing is made of a low friction material.

37. A cutting tool assembly as claimed in claim 29, wherein said top surface is concave.

* * * * *